United States Patent
Altman et al.

(10) Patent No.: US 11,074,033 B2
(45) Date of Patent: Jul. 27, 2021

(54) ACCESS CONTROL AND VALIDATION USING SONIC TONES

(71) Applicant: LISNR, Inc., Cincinnati, OH (US)

(72) Inventors: Chelsea Altman, Cincinnati, OH (US); Ian Andrew Birnam, Cincinnati, OH (US); Paul Dehmer, Cincinnati, OH (US)

(73) Assignee: LISNR, Inc., Cincinnati, OH (US)

( * ) Notice: Subject to any disclaimer, the term of this patent is extended or adjusted under 35 U.S.C. 154(b) by 192 days.

(21) Appl. No.: 16/040,762

(22) Filed: Jul. 20, 2018

(65) Prior Publication Data

US 2018/0329676 A1    Nov. 15, 2018

Related U.S. Application Data (63) Continuation-in-part of application No. 14/398,675, filed as application No. PCT/US2013/039079 on May 1, 2013.

(Continued)

(51) Int. Cl.
   *G06F 3/16* (2006.01)
   *H04M 1/215* (2006.01)
   (Continued)

(52) U.S. Cl.
   CPC ............. *G06F 3/165* (2013.01); *H04B 11/00* (2013.01); *H04L 67/02* (2013.01); *H04L 67/141* (2013.01);
   (Continued)

(58) Field of Classification Search
   CPC ......... G06F 3/165; H04B 11/00; H04L 67/02; H04L 67/141; H04L 67/18; H04L 67/22;
   (Continued)

(56) References Cited

U.S. PATENT DOCUMENTS 5,159,703 A    10/1992  Lowery
5,335,250 A    8/1994   Dent et al.
(Continued)

FOREIGN PATENT DOCUMENTS

CN    103 023 583 B    4/2015
EP    1758308 A1       2/2007
(Continued)

OTHER PUBLICATIONS

QR Code Authentication with Embedded Message Authentication CodeChen, Changsheng. Mobile Networks and Applications 22.3: 383-394. New York: Springer Nature B.V. (Jun. 2017) (Year: 2017).*

(Continued)

*Primary Examiner* — Michael Won
(74) *Attorney, Agent, or Firm* — Wood Herron & Evans LLP (57) ABSTRACT

Controlled access to a physical area or secured service is managed using sonic tones. A secret key is stored in a user device and in a security system, and then when access is desired, the secret key or a derivative thereof is encoded into a sonic tone which is transmitted. The sonic tone is received and decoded to obtain the encoded binary message, which is then compared to an expected binary message, and if there is a match, access is granted by the security system. In illustrated particular embodiments the secret key is used to generate a one-time password based upon the secret key and a randomizing factor, such as the current time.

20 Claims, 4 Drawing Sheets

Related U.S. Application Data (60) Provisional application No. 61/781,107, filed on Mar. 14, 2013, provisional application No. 61/640,900, filed on May 1, 2012.

(51) Int. Cl.

| | | |
|---|---|---|
| *H04M 1/50* | (2006.01) | |
| *H04N 21/414* | (2011.01) | |
| *H04N 21/422* | (2011.01) | |
| *H04N 21/658* | (2011.01) | |
| *H04N 21/81* | (2011.01) | |
| *H04N 21/8358* | (2011.01) | |
| *H04B 11/00* | (2006.01) | |
| *H04L 29/08* | (2006.01) | |
| *H04M 1/72457* | (2021.01) | |

(52) U.S. Cl.
CPC .............. *H04L 67/18* (2013.01); *H04L 67/22* (2013.01); *H04M 1/2155* (2013.01); *H04M 1/505* (2013.01); *H04N 21/41407* (2013.01); *H04N 21/42203* (2013.01); *H04N 21/6581* (2013.01); *H04N 21/8106* (2013.01); *H04N 21/8358* (2013.01); *H04M 1/72457* (2021.01); *H04M 2250/12* (2013.01)

(58) Field of Classification Search
CPC ............... H04M 1/2155; H04M 1/505; H04M 1/72572; H04M 2250/12; H04M 1/72457; H04N 21/6581; H04N 21/41407; H04N 21/8106; H04N 21/8358; H04N 21/42203
USPC ........................................................ 709/217
See application file for complete search history.

(56) References Cited

U.S. PATENT DOCUMENTS

| | | | |
|---|---|---|---|
| 5,485,839 A | 1/1996 | Aida et al. | |
| 5,565,921 A | 10/1996 | Sasaki et al. | |
| 5,764,763 A | 6/1998 | Jensen et al. | |
| 5,889,870 A | 3/1999 | Norris | |
| 5,923,252 A | 7/1999 | Sizer et al. | |
| 5,995,512 A | 11/1999 | Pogue, Jr. | |
| 6,301,368 B1 | 10/2001 | Bolle et al. | |
| 6,511,426 B1 | 1/2003 | Hossack et al. | |
| 6,570,500 B1 | 5/2003 | Pieper | |
| 6,664,913 B1 | 12/2003 | Craven et al. | |
| 6,891,482 B2 | 5/2005 | Craven et al. | |
| 6,912,319 B1 | 6/2005 | Barnes et al. | |
| 6,947,893 B1 | 9/2005 | Iwaki et al. | |
| 7,334,735 B1 | 2/2008 | Antebi et al. | |
| 7,904,946 B1* | 3/2011 | Chu ...................... H04L 63/067 |
| | | | 726/5 |
| 7,995,197 B2 | 8/2011 | Sikora et al. | |
| 8,140,331 B2 | 3/2012 | Lou | |
| 8,401,569 B1 | 3/2013 | Bell et al. | |
| 8,532,644 B2 | 9/2013 | Bell et al. | |
| 8,544,753 B2 | 10/2013 | Antebi et al. | |
| 8,711,656 B1 | 4/2014 | Paulson | |
| 8,976,959 B2 | 3/2015 | Duplan et al. | |
| 8,983,089 B1 | 3/2015 | Chu et al. | |
| 8,989,779 B1 | 3/2015 | Centore, III | |
| 9,024,998 B2 | 5/2015 | Chu et al. | |
| 9,111,326 B1 | 8/2015 | Worley, III et al. | |
| 9,213,969 B2 | 12/2015 | Arentz | |
| 9,318,166 B2 | 4/2016 | Sharon et al. | |
| 9,361,444 B2 | 6/2016 | Antebi et al. | |
| 9,513,861 B2 | 12/2016 | Lin et al. | |
| 9,766,702 B2 | 9/2017 | Cieplinski et al. | |
| 9,912,415 B2 | 3/2018 | Tsfaty et al. | |
| 10,044,448 B2 | 8/2018 | Mufti | |
| 10,826,623 B2 | 11/2020 | Prince et al. | |
| 2001/0049788 A1 | 12/2001 | Shur | |
| 2002/0008615 A1 | 1/2002 | Heide et al. | |
| 2002/0152045 A1* | 10/2002 | Dowling ................ B60Q 3/30 |
| | | | 702/107 |
| 2003/0206602 A1 | 11/2003 | Yamamoto | |
| 2003/0217269 A1* | 11/2003 | Gantman .............. H04L 9/3234 |
| | | | 713/172 |
| 2004/0018018 A1* | 1/2004 | Izadpanah ........... F16K 37/0075 |
| | | | 398/77 |
| 2004/0111360 A1 | 6/2004 | Albanese | |
| 2005/0008325 A1 | 1/2005 | Ollis et al. | |
| 2005/0171649 A1 | 8/2005 | Adachi | |
| 2005/0177361 A1 | 8/2005 | Srinivasan | |
| 2005/0190768 A1 | 9/2005 | Cutler | |
| 2006/0041759 A1* | 2/2006 | Kaliski, Jr. ......... H04L 63/0869 |
| | | | 713/184 |
| 2006/0123239 A1* | 6/2006 | Martinian ............. H04L 9/3236 |
| | | | 713/186 |
| 2006/0136544 A1 | 6/2006 | Atsmon et al. | |
| 2006/0138231 A1* | 6/2006 | Elberbaum ............ G08C 19/28 |
| | | | 235/439 |
| 2007/0153091 A1 | 7/2007 | Watlington et al. | |
| 2007/0220544 A1 | 9/2007 | Nash-Putnam | |
| 2007/0272750 A1 | 11/2007 | Bjorklund | |
| 2008/0071537 A1* | 3/2008 | Tamir ..................... G07C 9/257 |
| | | | 704/246 |
| 2008/0134264 A1 | 6/2008 | Narendra et al. | |
| 2008/0157938 A1* | 7/2008 | Sutardja ................ G08B 19/00 |
| | | | 340/12.32 |
| 2008/0165022 A1 | 7/2008 | Herz et al. | |
| 2008/0173717 A1 | 7/2008 | Antebi et al. | |
| 2008/0227436 A1 | 9/2008 | Gantman et al. | |
| 2008/0228498 A1 | 9/2008 | Gasque | |
| 2009/0019061 A1 | 1/2009 | Scannell, Jr. | |
| 2009/0088133 A1 | 4/2009 | Orlassino | |
| 2009/0210789 A1 | 8/2009 | Thakkar et al. | |
| 2010/0034474 A1 | 2/2010 | Crucs | |
| 2010/0053169 A1 | 3/2010 | Cook | |
| 2010/0149022 A1 | 6/2010 | Fam et al. | |
| 2010/0165879 A1 | 7/2010 | Gupta et al. | |
| 2010/0280641 A1 | 11/2010 | Harkness et al. | |
| 2010/0305449 A1 | 12/2010 | Wegener et al. | |
| 2010/0331689 A1 | 12/2010 | Wegener | |
| 2011/0029359 A1 | 2/2011 | Roeding et al. | |
| 2011/0099295 A1 | 4/2011 | Wegener | |
| 2011/0124399 A1 | 5/2011 | Dutilly et al. | |
| 2011/0143677 A1 | 6/2011 | Jung et al. | |
| 2011/0164595 A1 | 7/2011 | So et al. | |
| 2011/0179182 A1* | 7/2011 | Vadla Ravnas ......... G06Q 10/10 |
| | | | 709/227 |
| 2011/0295691 A1 | 12/2011 | Krieter | |
| 2011/0301439 A1 | 12/2011 | Albert et al. | |
| 2012/0051187 A1 | 3/2012 | Paulson | |
| 2012/0064874 A1* | 3/2012 | Pierce, Jr. .......... H04M 1/72522 |
| | | | 455/418 |
| 2012/0084131 A1 | 4/2012 | Bergel et al. | |
| 2012/0089461 A1 | 4/2012 | Greenspan | |
| 2012/0134238 A1 | 5/2012 | Surprenant et al. | |
| 2012/0179525 A1 | 7/2012 | Seguin et al. | |
| 2012/0197738 A1* | 8/2012 | Wakabayashi ..... G06Q 30/0276 |
| | | | 705/14.69 |
| 2012/0209949 A1 | 8/2012 | Deliyannis et al. | |
| 2012/0214416 A1 | 8/2012 | Kent et al. | |
| 2012/0232906 A1 | 9/2012 | Lindahl | |
| 2012/0295560 A1 | 11/2012 | Mufti | |
| 2013/0078988 A1 | 3/2013 | Bell et al. | |
| 2013/0079057 A1 | 3/2013 | Bell et al. | |
| 2013/0082850 A1 | 4/2013 | Takeshima | |
| 2013/0106977 A1 | 5/2013 | Chu et al. | |
| 2013/0176984 A1 | 7/2013 | Koezuka | |
| 2013/0185137 A1* | 7/2013 | Shafi .................. G06Q 30/0207 |
| | | | 705/14.35 |
| 2013/0262539 A1 | 10/2013 | Wegener | |
| 2013/0273968 A1 | 10/2013 | Rhoads et al. | |
| 2013/0279300 A1 | 10/2013 | Iwase et al. | |
| 2014/0039654 A1 | 2/2014 | Akiyama et al. | |
| 2014/0045586 A1 | 2/2014 | Allen et al. | |
| 2014/0050321 A1 | 2/2014 | Albert et al. | |
| 2014/0101738 A1* | 4/2014 | Sama ................... H04L 63/083 |
| | | | 726/6 |

(56) References Cited

U.S. PATENT DOCUMENTS

| | | |
|---|---|---|
| 2014/0129232 A1 | 5/2014 | Jones et al. |
| 2014/0140503 A1 | 5/2014 | Duplan et al. |
| 2014/0172141 A1 | 6/2014 | Mangold |
| 2014/0369527 A1 | 12/2014 | Baldwin |
| 2015/0113094 A1 | 4/2015 | Williams et al. |
| 2015/0243163 A1* | 8/2015 | Shoemake ............ H03M 13/09 367/197 |
| 2015/0297193 A1 | 10/2015 | Rothberg et al. |
| 2015/0309151 A1 | 10/2015 | Shibata et al. |
| 2016/0142157 A1 | 5/2016 | Jeong et al. |
| 2016/0373430 A1* | 12/2016 | Bhat ................... H04L 63/0838 |
| 2017/0279542 A1 | 9/2017 | Knauer et al. |
| 2017/0279571 A1 | 9/2017 | Melodia et al. |
| 2018/0132298 A1* | 5/2018 | Birnam ................ H04W 76/11 |
| 2018/0167147 A1 | 6/2018 | Almada et al. |
| 2018/0329676 A1 | 11/2018 | Williams et al. |
| 2019/0096412 A1 | 3/2019 | Knauer et al. |
| 2019/0190621 A1 | 6/2019 | Prince et al. |
| 2019/0204409 A1 | 7/2019 | Booij et al. |
| 2019/0253101 A1 | 8/2019 | Kilian et al. |
| 2019/0268078 A1 | 8/2019 | Okunev et al. |

FOREIGN PATENT DOCUMENTS

| | | |
|---|---|---|
| EP | 2847984 A1 | 3/2015 |
| EP | 3207639 A1 | 8/2017 |
| EP | 3358811 A1 | 8/2018 |
| JP | 06-90296 A | 3/1994 |
| JP | 2001-320337 A | 11/2001 |
| JP | 2003-1744404 A | 6/2003 |
| JP | 2003-324491 A | 11/2003 |
| JP | 2007-164659 A | 6/2007 |
| JP | 2008-293393 A | 12/2008 |
| JP | 2011-141784 A | 7/2011 |
| JP | 2012-525655 A | 10/2012 |
| KR | 10-1136279 B1 | 4/2012 |
| RU | 2326495 C2 | 6/2008 |
| WO | 2002/45273 A2 | 6/2002 |
| WO | 2005/122483 A1 | 12/2005 |
| WO | 2013/129587 A1 | 9/2013 |
| WO | 2013/166158 A1 | 11/2013 |
| WO | 2014/069617 A1 | 5/2014 |
| WO | 2014/104284 A1 | 7/2014 |
| WO | 2016/061353 A1 | 4/2016 |
| WO | 2016123047 A1 | 8/2016 |
| WO | 2019/067861 A1 | 4/2019 |

OTHER PUBLICATIONS

Min, G. et al., "Performance Analysis of Different Phase Shift Keying Modulation Schemes in Aeronautical Channels", Jun. 2009.

Chitode, J.S. Communication Theory. 2002. Technical Publications. Prune. 5-28. Sec. 5-6 near 5-7 Source Coding Theorem Shannon's First Theorem). (Year: 2002).

Lee et al.; Chirp Signal-Based Aerial Acoustic Communication for Smart Devices; 2015.

* cited by examiner

ACCESS CONTROL AND VALIDATION USING SONIC TONES

CROSS REFERENCE TO RELATED APPLICATIONS

This application is a continuation-in-part of U.S. patent application Ser. No. 14/398,675, which was filed as PCT application Ser. No. U.S./2013/039079 on May 1, 2013, and published in the United States on Apr. 23, 2015 as Publication US2015-0113094, and claims benefit of U.S. Provisional Patent Application Ser. Nos. 61/781,107 filed Mar. 14, 2013 and 61/640,900 filed May 1, 2012, each of which is incorporated herein by reference in its entirety.

TECHNICAL FIELD

This application generally relates to systems and methods for using sonic tones to communicate digitized information, and specifically the use of sonic tones in controlled access to a secure area or system.

BACKGROUND OF THE INVENTION

Various proposals have been made to transmit sonic tones to convey digital information, either independently or with audio content that is transmitted or played back audibly in a public or private environment. For example, a sonic tone may be embedded in audio content that is received by a microphone of a device after transmission by an audio speaker within the proximity of the device.

Example systems and methods for embedding sonic tones into audio content are provided in the above-referenced PCT Application, as well as the following US patent applications, the entirety of which applications is hereby incorporated by reference in their entirety: U.S. patent application Ser. No. 13/286,613 entitled "SYSTEM EFFECTIVE TO MODULATE A CODE AND PROVIDE CONTENT TO A USER" filed Nov. 1, 2011, U.S. patent application Ser. No. 13/286,670 entitled "SYSTEM EFFECTIVE TO DEMODULATE A MODULATED CODE AND PROVIDE CONTENT TO A USER" filed September Nov. 1, 2011, U.S. patent application Ser. No. 13/286,727 entitled "DEVICE EFFECTIVE TO MODULATE A CODE AND TO PROVIDE CONTENT TO A USER" filed Nov. 1, 2011, U.S. patent application Ser. No. 15/081,158 entitled "LOCAL TONE GENERATION" filed Mar. 15, 2016, U.S. patent application Ser. No. 15/719,164 entitled "HIGH BANDWIDTH SONIC TONE GENERATION" filed Sep. 28, 2017, and U.S. patent application Ser. No. 15/847,205 entitled "PHASE SHIFT KEYED SIGNALING TONE" filed Dec. 19, 2017.

In some cases described in these filings, the sonic tones may be inaudible, i.e., signals that are outside the range of human hearing or other signals not otherwise detectable by humans. For example, in some embodiments, the sonic tone may be generated by frequencies near to 20,000 Hz or less than 20 Hz, or in a frequency band near to 20,000 Hz or near to 20 Hz which is generally sonic. The sonic tone may be the form of a modulated code, as described in the above-referenced patent applications, which is a series of logic 0s and 1s. The modulated code may be repeatedly and periodically output by the sound source, enabling the receiving device to identify and demodulate the modulated code in the sonic tone to determine the logical series of 0s and 1s associated with the sonic tone. In some embodiments, the logical series of 0s and 1s may be, for example, a coded identifier which can be transmitted to a content management system via various communications protocols.

As used herein, the term sonic tone is used to broadly refer to any type of acoustic signal, code, frequency, waveform, or otherwise that may be transmitted by an acoustic source and detected by a microphone or decoded by a sound processing device. The sonic tone may be processed by a process or routine passively running on the device or one which is activated manually by a user of the device.

In one application of the sonic tone described in U.S. patent application Ser. No. 14/398,675, the sonic tone enables unlocking of a door, such as a hotel room or private residence, in a contactless manner. It is an object of the present invention to provide a detailed routine for implementation of an ad-hoc networking process as described therein.

SUMMARY OF THE INVENTION

According to one aspect, access to a physical area or secured service is obtained by a user, by a method including storing a secret key in a user device and in a security system, and then when access is desired, using the secret key to generate a sonic tone encoding the secret key or a derivative thereof, and transmitting the sonic tone. The sonic tone is then received and decoded and its content compared to an expected content, and if there is a match, access is granted by the security system.

In specific disclosed embodiments, the secret key may be used to generate a one-time password based upon the secret key and a randomizing factor, such as the current time, and the one time password encoded into the sonic tone. The one-time password decoded from the sonic tone by the receiving security system can be compared to an expected one time password based upon the secret key and randomizing factor, to grant or deny access. In other embodiments the secret key may be one of several secret keys which are pre-shared between the user device and receiving security system, which are used one time or a limited number of times by the user device to obtain access.

In some embodiments, the sonic tone may be human-audible, or limited to a frequency range which is generally human-inaudible. Furthermore, the security system and user device may be connected to communicate over a network to obtain the secret key or keys or randomizing factor, e.g., to communicate with each other or with key servers or with one or more network time protocol servers to obtain the current time. To facilitate use of the security system by multiple users, each secret key may be stored in association with a user identity, and the sonic tone may embed a user identifier and one time password, so that the user identifier can be extracted from the sonic tone and used to obtain the secret key(s) for that user, which can then be used directly, or used to generate an expected one time password.

The secured service can include a server, workstation, entertainment system, or any other device which requires credentials, and the secured service may also be a subscription service which is authorized to a particular user. For example the security system may be in network communication with a remote server requiring authentication, which can be provided by the security system to the remote server in response to the receipt of the correct expected binary message by the security system. In one example the remote server may require authentication by the security system, e.g. by the delivery to the security system of a sonic tone embedding an expected binary message. In one use case the sonic tone may be delivered to the security system directly, and in alternate use cases the sonic tone may be recorded by a microphone at a user's device and then delivered as an audio file to the security system via a network connection. In other use cases, the remote server may require conventional authentication via a user name and password, and then require a second factor authentication by the security system in the manners described herein.

The invention includes the method of controlled access as well as a security system for providing controlled access by implementation of the described processes.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, explain the embodiments of the invention. In the drawings, like reference numbers generally indicate identical, functionally similar, and/or structurally similar elements.

DETAILED DESCRIPTION OF THE INVENTION

Various non-limiting embodiments of the invention are described to provide an understanding of the principles of the structure, function, and use of the content delivery and management systems and processes disclosed herein. One or more examples of these non-limiting embodiments are illustrated in the accompanying drawings. Persons of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of this disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The embodiments disclosed herein are generally directed to the transmission of security information in a sonic tone, and the configuration of devices and security systems for generation, transmission, reception, decoding and evaluation of sonic tone tones that are thus transmitted. The devices and security systems may be configured to transmit a sonic tone to request access and/or to respond to reception of a sonic tone by providing or denying the requested access. Formats for sonic tones and the encoding of binary information into such tones is discussed in detail in the above-referenced patent filings.

Figure 1:
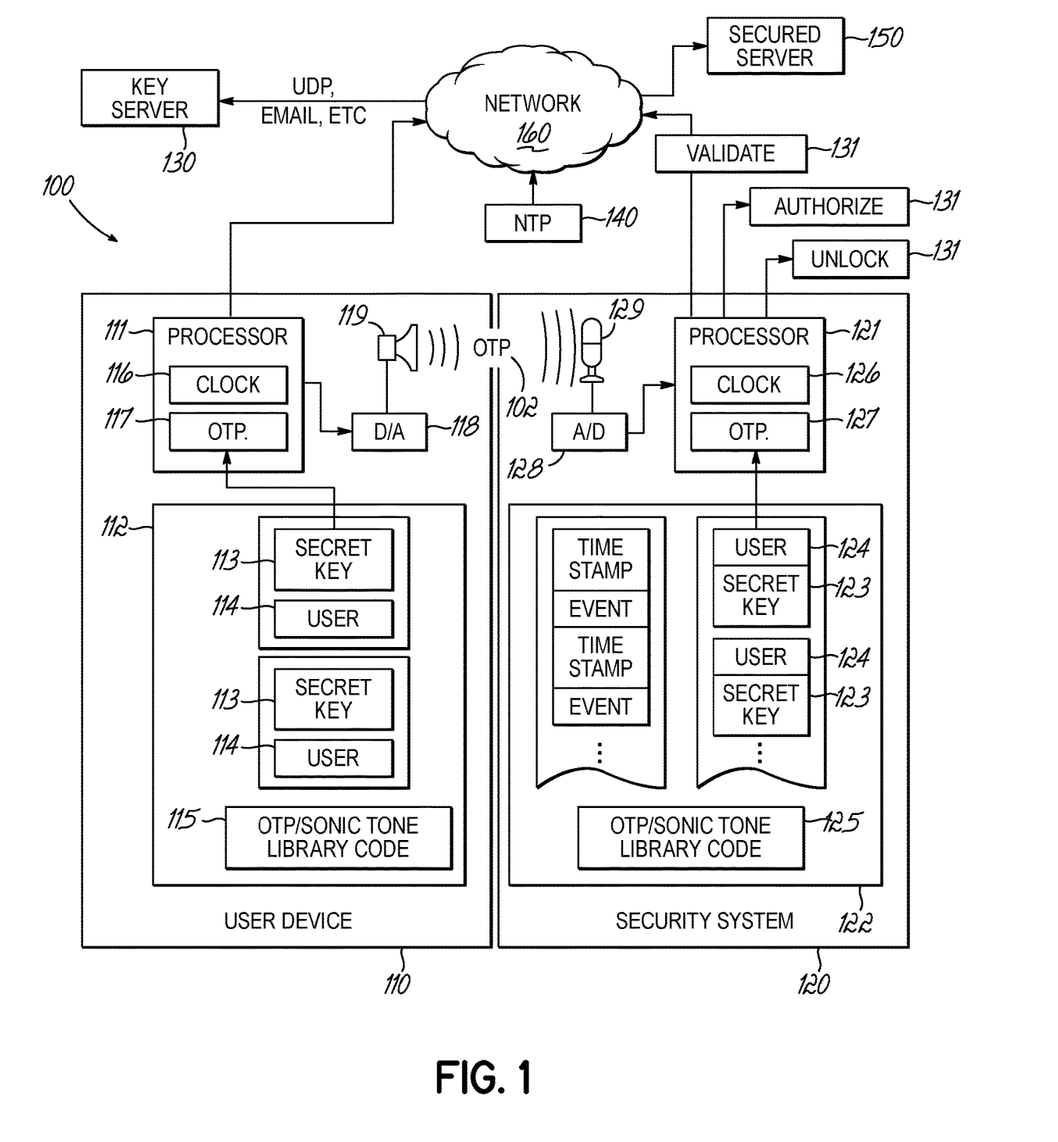
FIG. 1 is a schematic illustration of an example environment in which a user device and security system may interact to provide access control consistent with principles of the present invention.

FIG. 1 is a schematic illustration of an example environment 100 in which a user device 110 generates a sonic tone 102 and delivers the same to a security system 120 so that an access request can be validated and granted if appropriate. In the particular embodiment illustrated here, the sonic tone encodes a one-time password (OTP) information in that sonic tone and an expected one-time password is created in the security system 120 as part of evaluating an access request, but other embodiments are possible and the scope of the present invention is not limited to this particular embodiment.

In some embodiments, the system 100 may include a key server 130 for facilitating the generation of secret keys for use by device 100 and security system 120. Further, the system may include a network time protocol (NTP) server 140 for providing synchronized time information to user device 110 and security system 120. Furthermore, the system may include a secured server 150, which is network connected to the security system 120, and for which the security system 120 may provide a proxy security service, and/or two factor authentication, based upon an OTP 102 embedded in a sonic tone, as described above.

The user device 110 and security system 120 may be in communication with each other and/or servers 130, 140 and 150 via an electronic communications network 160, typically including one or more private networks and/or the public Internet. The communications network may include any number of computer and/or data networks, including the Internet, LANs, WANs, GPRS networks, etc., and may comprise wired and/or wireless communication links. The networkable devices and servers that communicate may be any type of device suitable for communication over the network, such as a server, workstation, personal computer, a laptop computer, or a notebook computer, for example.

In some example embodiments, the user device 110 may be one of many possible devices, such as a combination handheld computer and mobile telephone device, sometimes referred to as a smart phone, or another type of computing device such as a tablet computer, laptop or palmtop PC, or other mobile computing device. For the disclosed embodiment it is anticipated that the user device is portable and personal to the user or a small group of users, however, it can be appreciated that while these embodiments may be described in connection with user communication via a smart phone or laptop by way of example, the invention may be implemented for other types of user equipment or wireless computing devices such as a mobile telephone, personal digital assistant (PDA), combination mobile telephone/PDA, handheld gaming device or mobile gaming device, messaging device, media player, or other suitable mobile communications devices. Furthermore, the invention may also be implemented using generally stationary hardware such as a desktop computer, gaming console, or the like.

In some embodiments the user device 110 and/or security system 120 may support wireless wide area network (WWAN) data communications services including Internet access for performing identified networking functions. Examples of WWAN data communications services may include Evolution-Data Optimized or Evolution-Data only (EV-DO), Long Term Evolution (LTE), Evolution For Data and Voice (EV-DV), CDMA/1×RTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. In each of these cases the networkable devices 102 may connect to the public Internet directly to communicate with the servers 130, 140 and/or 150.

Networking by user device 110 and security system 120 can also proceed using any number of known local wireless protocols, such as in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

Network communication by user device 110 and security system 120 can also be in accordance with shorter range wireless networks, such as a wireless personal area network (PAN) offering Bluetooth® data communications services in accordance with the Bluetooth®. Special Interest Group (SIG) series of protocols, specifications, profiles, and so forth. Other examples of shorter range wireless networks may employ infrared (IR) techniques or near-field communication (NFC) techniques and protocols, such as electromagnetic induction (EMI) techniques including passive or active radio-frequency identification (RFID) protocols and devices.

The user device 110 may use a variety of applications for allowing a user to accomplish one or more specific tasks other than generation of a sonic tone for secure access. For example, the user device 110 may implement an operating system with functionality for searching for an establishing Wi-Fi communication and functionality for pairing to Bluetooth compliant hosts in a PAN. The operating system may further allow the installation of user-selected application software to provide computing capabilities of a wide variety. In addition to communication functions, operating system programs implemented by the user device 110 may include, without limitation, device drivers, programming tools, utility programs, software libraries, application programming interfaces (APIs), and so forth. As is to be appreciated, the user device 110 may include any suitable OS, such as a mobile OS (ANDROID, BLACKBERRY OS, iOS, SYMBIAN OS, WINDOWS PHONE, and so forth), a desktop OS (MAC OS X, LINUX, WINDOWS, GOOGLE CHROME OS, and so forth) or a television OS (GOOGLE TV, APPLE TV, or other Smart TV OS), for example.

Other networkable devices, such as stationary devices connected to AC mains power and wired networks, are also contemplated as potential users of the methods described herein with and are within the scope of principles of the invention.

The invention will now be described in greater detail in connection with a specific embodiment in which secure access is obtained by the use of a one-time password generated from a secret key. Other embodiments are also possible including an embodiment, as noted above, in which a group of secret keys are shared between the user device and receiving security system, and which are used either one time or a few times each to obtain access.

As illustrated in FIG. 1, the user device typically includes a processor 111 for implementing an operating system and application code, including code that performs steps consistent with the present invention. The processor is in communication with a memory 112 for storing code and data used by the processor. Included in the memory are one or more secret keys 113, each associated with a user identity 114 for the user of that secret key. Because a given device may be used by more than one user, memory 112 may contain plural secret keys for plural users. Furthermore, the device may be used with multiple security systems and for each security system a particular user may use a different secret key. Thus, for this reason as well, plural secret keys may be stored in memory 112 even where only one user uses the device 110 for security activity in accordance with the present invention.

Memory 112 also includes a library of code 115 for generating a sonic tone for binary content. In the particular illustrated use case, the library 115 includes additional code for generating a one-time password (OTP), and processor 111 uses this library code to generate a one-time password in response to a secret key for a particular user, and the current time (stored in the processor clock 116). The processor then uses the library code to encode that one-time password, and a user identity, into a sonic tone, using techniques such as those described in the Assignee's above-referenced patent filings. The sonic tone embedding this one-time password is typically represented as a sound file 117, which is delivered to a digital-to-analog conversion subsystem 118, for playback on a speaker 119 of the user device 110. The resulting sonic tone 102 radiates acoustically in the space surrounding the user device 110.

As shown in the embodiment of FIG. 1, the security system typically includes a processor 121 for implementing an operating system and application code, including code that performs steps consistent with the present invention. The processor is in communication with a memory 122 for storing code and data used by the processor. Included in the memory are one or more secret keys 123, each associated with a user identity 124 for the user of that secret key. Because the security system may be used by more than one user, memory 122 may contain plural secret keys for plural users.

Memory 122 also includes a library of code 125 for decoding a sonic tone for binary content, and, in the particular illustrated embodiment, for generating a one-time password (OTP). In this particular embodiment, processor 121 uses the library code 125 to decode a one-time password, and a user identity, from a sonic tone received by a microphone 129 via an analog to digital conversion subsystem 128. The decoding of the sonic tone uses techniques such as those described in the Assignee's above-referenced patent filings. Once the sonic tone has been decoded, the processor 121 may use the library code 125 to generate its own copy of a one-time password 127 for the identified user, using the identity of the user and the secret key 124 stored for that user. More specifically, the one-time password 127 is created in response to a secret key for the identified user, and the current time (stored in the processor clock 126).

Security system 120 generates signals to unlock, authorize or validate access, which are delivered directly or via networked connections, as appropriate, to permit or deny the requested access. These connections are generally represented at 131.

Figure 2:
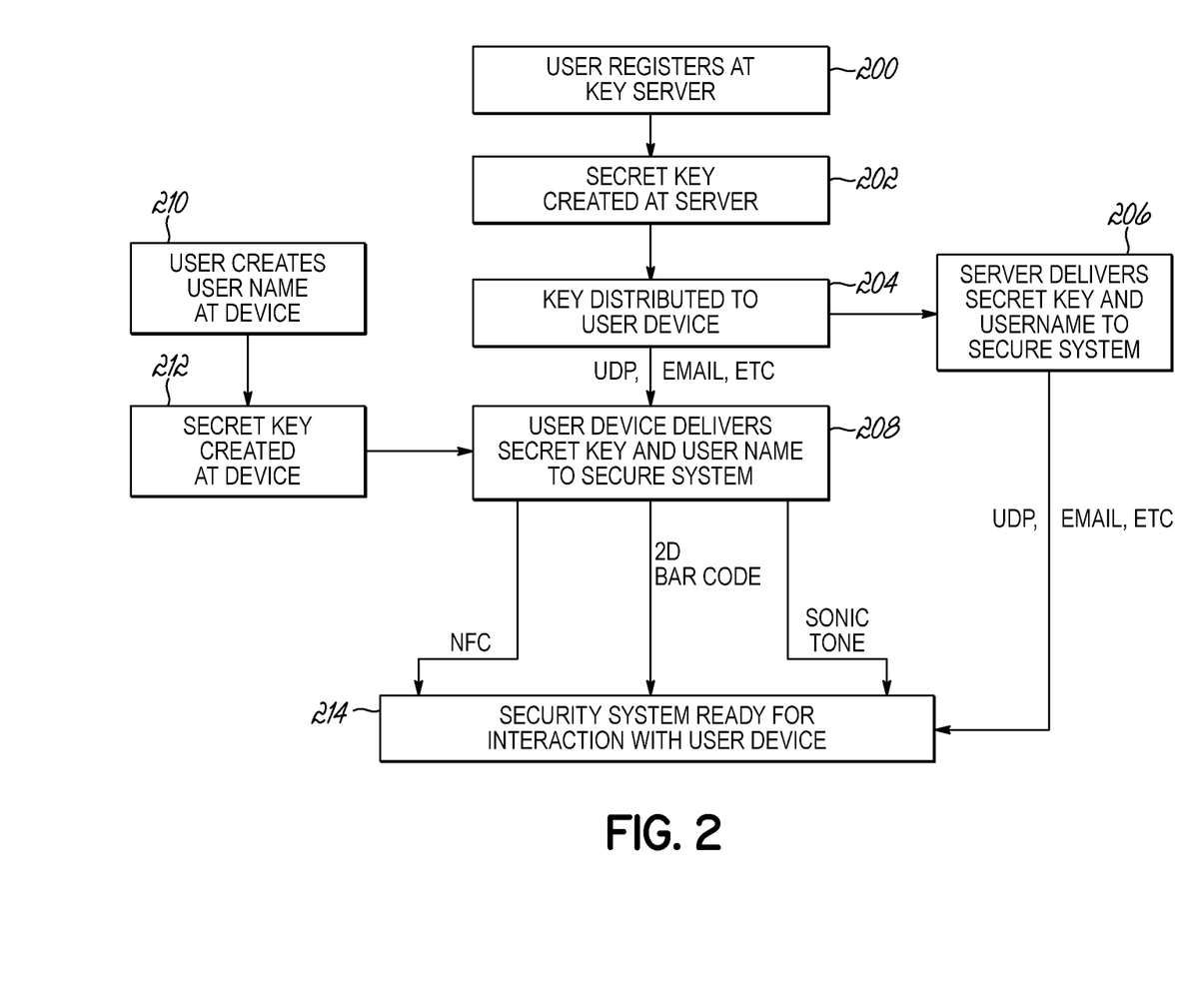
FIG. 2 is a flow chart illustrating a method by which a user device and security system are initialized for access control, according to an embodiment.

Turning now to FIG. 2, the process for establishing a user and secret key can be illustrated. In a first alternative embodiment, the process begins with step 200 in which the user registering at the key server 130 to obtain a secret key. This process would typically involve registering by providing the user's email address, which could be used as a username, or the user can select an available username. The user further provides a password for account security. In response, in step 202, a secret key is created by the key server 130, and then in step 204 the secret key is distributed to the user device 110. If the user connects to the key server with an app running on the user device, the secret key can be distributed by direct delivery of the key to the app. Alternately, the secret key may be delivered to the user's email account via an email sent to the registered email address, in which case the email may contain the secret key or a link to the same along with, for example, a link to download the app. As another alternative, the app in the user device can be registered with the user's name and password credentials and use these to retrieve the secret key from the key server.

Once a secret key has been delivered to the user device, the secret key and the user identifier for that secret key needs to also be delivered to the security system. In one embodiment, in step 206, the key server 130 delivers the secret key and the username directly to the secure system. In this embodiment, for example, the secure system may routinely query the key server for new secret keys and usernames of users authorized by the key server to have access to the security system. In an alternative embodiment, in step 208 the user device may itself deliver the secret key and username to the security system, for example in a programming mode of the security system which is enabled using a master key. The user device may deliver the key using a sonic tone, or other protocols such as a two-dimensional bar code, near field communication (NFC), manual entry on a keyboard of the security system, or any other available method.

In an alternative embodiment shown in FIG. 2, a key server 130 may not be used; in this embodiment, in step 210 the user establishes a username using the user device itself, and in step 212 the user obtains a secret key using software at the user device. These are then conveyed to the security system in step 208 using a programming mode, as discussed above.

Through the above steps, the configuration of the user device and security system can be completed, so that at step 214 the security system and user device are configured for interaction, each system having the user name for a user permitted access, and a secret key for the user.

Figure 3:
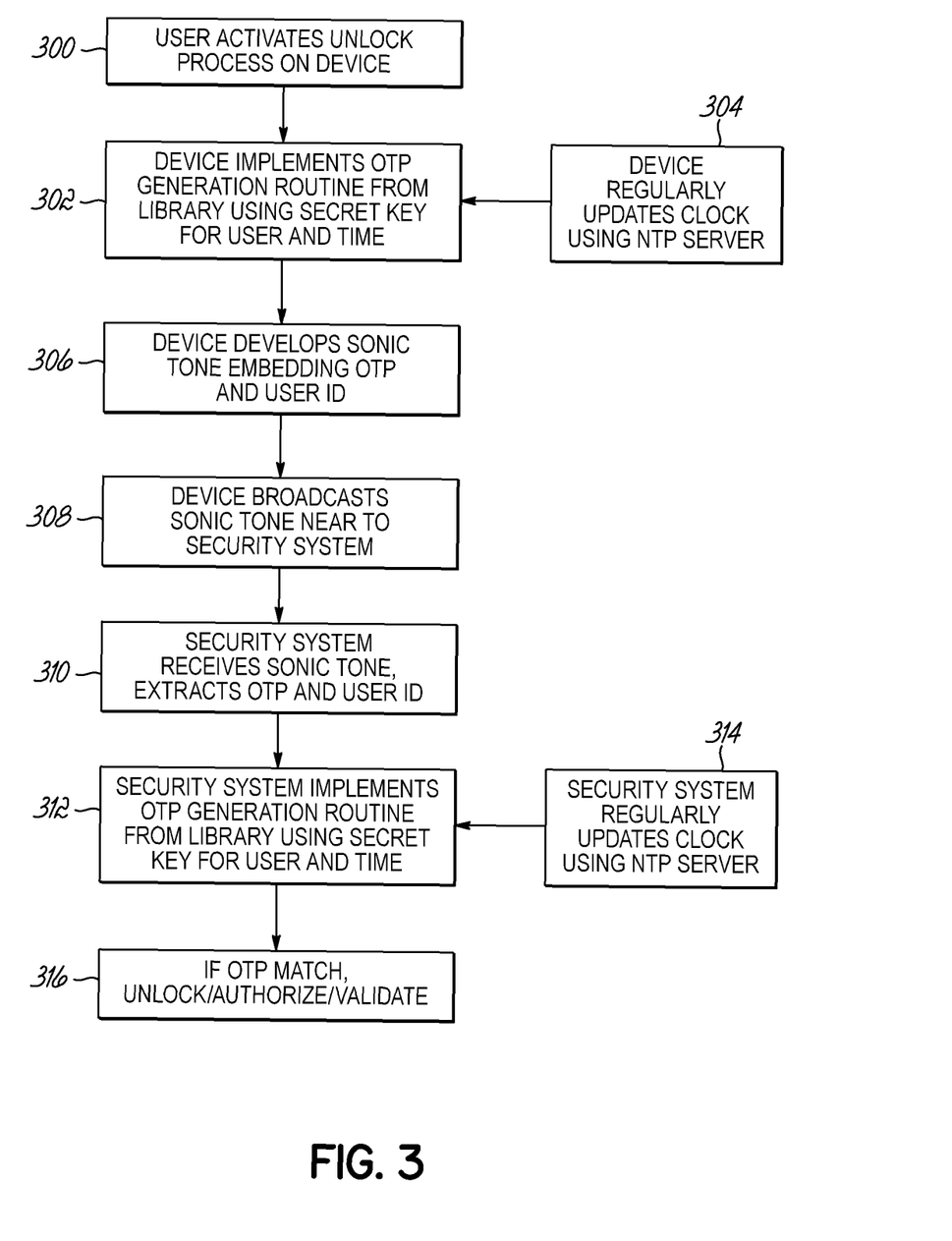
FIG. 3 is a flow chart illustrating a method by which a user device and security system interact to provide access control, according to an embodiment.

Turning now to FIG. 3, in the particular embodiment described herein, a one-time password is generated and used to access the secured system or facility, in a sequence of steps initiated by a user device 110. In a first step 300 for this particular embodiment, the user activates an unlock process using software in the user device 110. Typically, this would involve providing a password, PIN number, or biometric (fingerprint, facial recognition) credential to the user device to validate the identity of the user, so that in response the device can initiate an unlocking process. Assuming the user's identity has been properly validated, in a next step 302 the device implements a one-time password (OTP) generation routine from the library code 115, using the secret key 113 stored for the user along with the current time in the processor's internal clock 116. To facilitate this step, on a regular basis the processor updates its internal clock (step 304) to synchronize with the clock of an NTP (network time protocol) server such as server 140 (FIG. 1).

After having developed an OTP, the user device then proceeds to step 306, and encodes the OTP and user identifier into a sonic tone, using the techniques described in the above-referenced patent filings of the assignee hereof. In step 308 the resulting sonic tone is then acoustically broadcast into the area near to the user device and secure system.

In step 310, the security system, having received the sonic tone, extracts the one-time password and user identity from the tone. Next, in step 312, the security system implements the OTP generation routine from the library code 125, to retrieve the secret key 124 for the user identity provided in the sonic tone, and then using the secret key and current time to create an expected one-time password. To facilitate this step, on a regular basis the processor updates its internal clock (step 314) to synchronize with the clock of an NTP (network time protocol) server such as server 140 (FIG. 1).

Finally, in step 316, the expected OTP generated by the security system is compared to the OTP provided in the sonic tone, and if the two match, then the security system delivers an unlock, authorize or validation signal to the controlled system, door or device.

A number of available one-time password algorithms may be used in implementation of the present invention. In the above example a time-based one-time password algorithm (TOTP) is used, which has been adopted as an Internet Engineering Task Force standard under RFC 6238, available at https://tools.ietf.org/html/rfc6238, which is incorporated herein by reference.

It will be appreciated that users of the system need not necessarily have a secret key for the system, and not every secret key needs to be bound to a user. For example, an administrator of the system, capable of adding or deleting users or keys, or initiating an administrative mode of the system, would not necessarily have a key in addition to their user identity.

Figure 4:
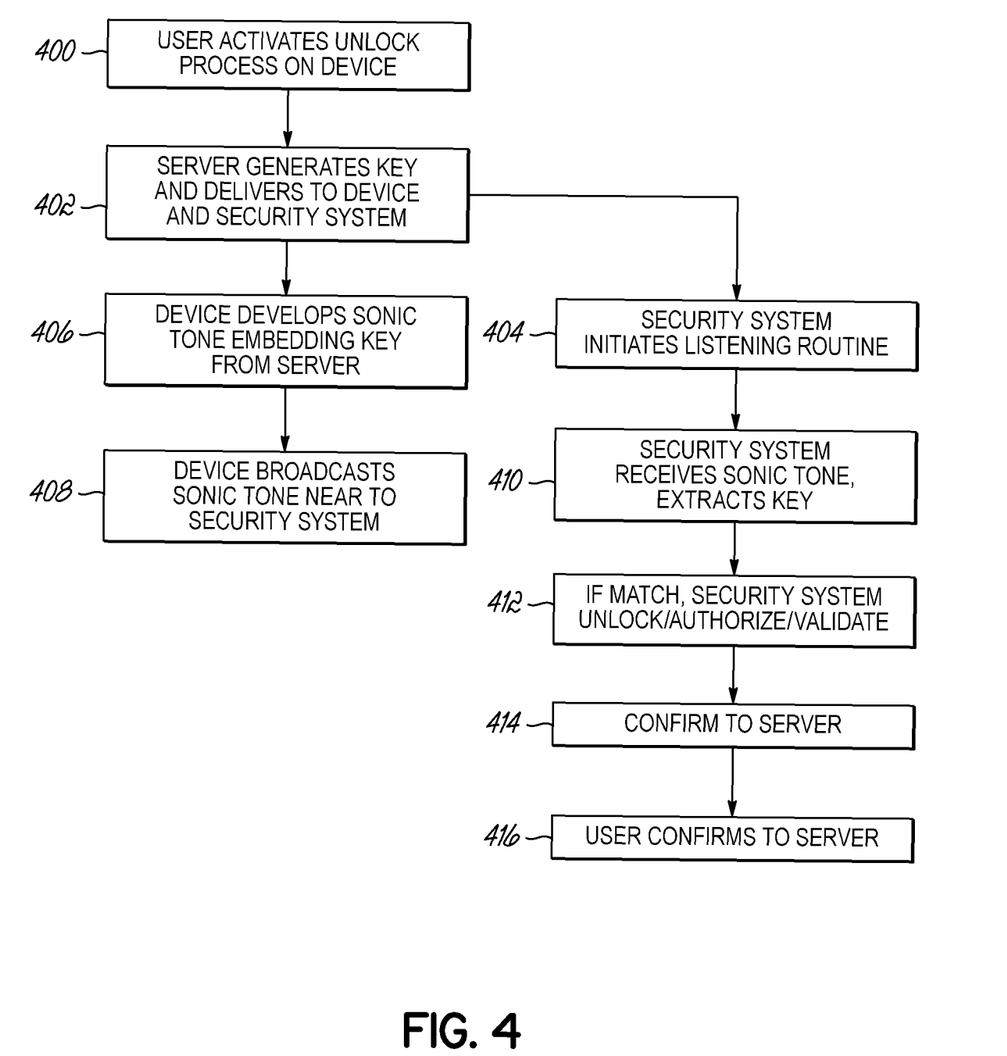
FIG. 4 is a flow chart illustrating a method by which a user device and security system interact to provide access control, according to an alternative embodiment.

It will be further appreciated that a one-time password need not be used in all cases for accessing the secured system or facility Referring to FIG. 4, in an alternative embodiment, a security system authenticates a user device in a sequence of steps that does not involve a one-time password. In a first step 400 for this particular embodiment, the user activates an unlock process using software in the user device 110. Typically, this would involve providing a password, PIN number, or biometric (fingerprint, facial recognition) credential to the user device to validate the identity of the user, so that in response the device can initiate an unlocking process. Assuming the user's identity has been properly validated, in a next step 402 a server generates a key and delivers it to the device and security system. After distribution of the key, the user device then proceeds to step 406, and encodes the key into a sonic tone, using the techniques described in the above-referenced patent filings of the assignee hereof. In step 408 the resulting sonic tone is then acoustically broadcast into the area near to the user device and (in theory) the secure system.

In step 404, the security system, having received the key, initiates a listening routine, so that when the tone is broadcast by the device in step 408 it is received in step 410 by the security system, and the security system extracts the key from the tone. Next, in step 412, the security system retrieve the key obtained from the server and matches it to the key from the sonic tone, and if there is a match, then the security system delivers an unlock, authorize or validation signal to the controlled system, door or device, after which this transaction is confirmed to the server in step 414 by the security system, by the user in step 416, and/or by both.

A hardware implementation of the security system may use any of a number of platforms, such as a Raspberry Pi platform, including microphone input and using GPIO pins of the Raspberry Pi to provide electronic control of a lock.

In various embodiments, security device 120 may detect the sonic tone through a generally passive detection process. In other words, a user does not necessarily have to routinely initiate or activate the detection process. Instead, the detection process may be a background routine that operates in the random access memory (RAM) of a security device 120, for example. The background routine may periodically, or at least routinely, query signals received or generated by various on-board components of the security device 120 to detect if a sonic tone is present. These queries may be performed without additional input from the user. Components queried by the detection process may include, without limitation, on-board analog-to-digital converters, and other audio ports (such as a line-in input, for example).

The specific functions of the security device and user device are not limited to the embodiments described herein. For example, the host device may take any number of forms or be embedded in any number of devices that have a or microphone and secure functions or wired or wireless communication capability. For example, the host device may be a television, telephone, computer, smartphone, tablet, headphone/headset, smartwatch, vehicle infotainment system, Virtual Reality or Enhanced Reality goggle, helmet or system, Internet-of-Things devices or personal assistants such as the Amazon Echo™ and Echo Dot™, Google Home™, and/or other fixed, mobile or wearable devices capable of reception of sonic tones and delivery of secured access to content or a physical location. The user device may be any of these devices as well, provided the user device has a speaker and some form of user interface. In particular, smartphone or tablet user device may authorize playback of subscription content on a television by authorization of a user via a key, password or one-time password, according to principles of the present invention. Alternately, a smartphone or tablet may receive authorization for playback of subscription content by authorization of a user's presence in a home, vehicle or particular commercial area, via a one-time password delivered by a television in that home, vehicle or commercial area.

The invention is further applicable to wearable devices which may deliver authorizations to other devices using the methods of the invention. A smartwatch, for example, may act as a user device and delivery authorization to a personal computer workstation acting as the security device. A hearing aid or activity monitor equipped with a speaker or microphone can also serve as the user device or security device depending upon available capabilities of the devices and desired use cases.

In addition, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium.

The operation and behavior of the embodiments may be described without specific reference to specific software code or specialized hardware components. The absence of such specific references is feasible, because it is clearly understood that artisans of ordinary skill would be able to design software and control hardware to implement the embodiments based on the specification with no more than reasonable effort and without undue experimentation.

Moreover, the processes associated with the disclosed embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network.

Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid-state transistors of the processor(s) and/or memory circuit(s), may change during operation of the circuits.

Thus, generally, while various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed:

1. A method of providing access to a physical area or secured service controlled by a security system via a wireless sonic tone, comprising:
   a. storing a secret key in a user device and in a security system;
   b. transmitting a sonic tone from the user device which encodes a symbol sequence representing binary information, the binary information including the secret key or a derivative thereof, wherein transmitting a sonic tone further comprises generating a one-time password in the user device, the one-time password derived from the secret key and a randomizing factor;
   c. receiving the sonic tone at the security system, and decoding the binary information;
   d. comparing expected binary information to the binary information decoded from the sonic tone in the security system, and in the event of a match granting access to the physical area or secured service.

2. The method of claim 1 further comprising generating an expected onetime password from the secret key and randomizing factor at the security system.

3. The method of claim 1 wherein the randomizing factor is a current date and/or time of day.

4. The method of claim 1 wherein the security system and user device are connected to a network and communicate over the network to obtain the randomizing factor.

5. The method of claim 4 wherein the security system and user device communicate over the network with one or more network time protocol servers to obtain a current time for use as a randomizing factor.

6. The method of claim 1 wherein a plurality of secret keys are stored in the user device and security system, the secret keys being used one or a limited number of times by the user device to acquire access from the security system.

7. The method of claim 1 wherein the security system stores multiple secret keys, each associated with a user identifier, and the sonic tone further embeds a user identifier, and the security system performs the steps of receiving the sonic tone and decoding the user identifier, and then using the user identifier to obtain the secret key for the identified user.

8. The method of claim 1 wherein the secured service is a subscription service which is authorized to a particular user associated with the secret key.

9. The method of claim 1 wherein the sonic tone is a human-audible sonic tone.

10. The method of claim 1 wherein the sonic tone is a human-inaudible sonic tone.

11. The method of claim 1 wherein the sonic tone is recorded in an audio file and delivered to the security system over a computer network connection.

12. A security system providing controlled access to a physical area or secured service via a wireless sonic tone, comprising:
   a. a memory storing a secret key;
   b. an interface for receiving a sonic tone as an acoustic wave captured via a microphone, or in or audio file format, the sonic tone encoding a symbol sequence representing a binary information;
   c. a processor programmed to perform the steps of:
      i. decoding the binary information to obtain the binary information,
      ii. accessing an expected binary information comprising the stored secret key or a derivative thereof,
      iii. comparing the expected binary information to the binary information decoded from the sonic tone in the security system, and
      iv. in the event of a match, granting access to the physical area or secured service,
   wherein the security system generates expected binary information by generating an expected one-time password from the secret key and a randomizing factor.

13. The security system of claim 12 wherein the randomizing factor is a current date and/or time of day.

14. The security system of claim 12 wherein the security system is connected to a network and communicates over the network to obtain the randomizing factor.

15. The security system of claim 14 wherein the security system communicates over the network with one or more network time protocol servers to obtain a current time for use as a randomizing factor.

16. The security system of claim 12 wherein a plurality of secret keys are stored in the security system, and the security system compares two or more of the plural secret keys or a derivatives thereof to a binary information to determine whether to grant or deny access to the physical area or secured service.

17. The security system of claim 12 wherein the memory stores multiple secret keys, each associated with a user identifier, and the sonic tone further embeds a user identifier, and the processor performs the steps of receiving the sonic tone and decoding the user identifier, and using the user identifier to obtain the secret key for the identified user from the memory.

18. The security system of claim 12 wherein the secured service is a subscription service which is authorized to a particular user associated with the secret key.

19. The security system of claim 12 wherein the sonic tone is a human-audible sonic tone.

20. The security system of claim 12 wherein the sonic tone is a human-inaudible sonic tone.

* * * * *